United States Patent [19]

Robert

[11] Patent Number: 5,685,148
[45] Date of Patent: Nov. 11, 1997

[54] DRIVE APPARATUS

[75] Inventor: Partel Robert, St. Johannesstr, Austria

[73] Assignee: Landis & Gyr Technology Innovation AG, Zug, Switzerland

[21] Appl. No.: 545,268

[22] Filed: Oct. 19, 1995

[30] Foreign Application Priority Data

Nov. 14, 1994 [CH] Switzerland ............... 3395/94

[51] Int. Cl.$^6$ ........................................ F03G 7/06
[52] U.S. Cl. ........................ 60/527; 74/22 R; 74/22 A
[58] Field of Search ................. 60/521, 523, 527; 74/22 R, 22 A; 251/319, 369, 905, 11; 337/36, 39, 85, 111, 140; 428/606

[56] References Cited

U.S. PATENT DOCUMENTS

| | | | |
|---|---|---|---|
| 3,174,851 | 3/1965 | Buehler et al. | 75/170 |
| 3,613,732 | 10/1971 | Wilson et al. | 137/625.44 |
| 3,680,306 | 8/1972 | Nikitin et al. | 60/23 |
| 3,858,141 | 12/1974 | Lackey | 337/140 |
| 3,893,055 | 7/1975 | Jost et al. | 337/140 |
| 4,086,769 | 5/1978 | Smith | 60/527 |
| 4,450,686 | 5/1984 | Banks | 60/527 |
| 4,811,564 | 3/1989 | Palmer | 60/527 |

FOREIGN PATENT DOCUMENTS

| | | |
|---|---|---|
| A-37 31 146 | 3/1989 | Germany . |
| A-42 09 815 | 9/1993 | Germany . |
| A-60-175777 | 9/1985 | Japan . |

OTHER PUBLICATIONS

*Metallwissenschaft–Technik*, "Anwendung von Memory–Legierungen in elektrischen Schaltgeräten," Tautzenberger and Stöckel, pp. 34–38 (Jan., 1985).

*Primary Examiner*—Ira S. Lazarus
*Assistant Examiner*—Nhat-Hang H. Lam
*Attorney, Agent, or Firm*—Meltzer, Lippe, Goldstein et al.

[57] ABSTRACT

A drive apparatus for reversible movements of an actuator is provided with a drive element made from a shape memory alloy with one-way effect. The drive element acts upon a lever rotatable about an axle in opposition to the force of a resetting element, wherein the lever can be used as a coupling member for converting a deformation of the drive element into a movement of the actuator. The drive element is a winding with a plurality of turns of a wire, wherein the turns are fixed and arranged mechanically parallel between an anchor point and the lever so that the lever is rotatable about the axle by means of a deformation of a turn, and the tractive force acting upon the lever by means of the drive element results from the individual forces of the turns of the winding acting mechanically parallel upon the lever. The diameter of the wire is advantageously approximately equal to the standardised diameter of the crystalline grain of the shape memory alloy in the austenitic state.

8 Claims, 3 Drawing Sheets

$d_D \approx d_K$

DRIVE APPARATUS

BACKGROUND OF THE INVENTION

1. Field of the Invention

The invention relates to a drive apparatus with a drive element made from a shape memory alloy.

Such drive apparatuses are suitable, for example, for actuating a valve plunger on a valve for controlling or regulating the flow of a liquid or gaseous flowable medium in heating, ventilation and air-conditioning technology.

2. Description of the Prior Art

It is known (P. Tautzenberger et al, Anwendung von Memory-Legierungen in elektrischen Schaltgeräten, Zeitschrift Metall, January 1985) to use shape memory alloys in electrical switchgear and thereby to make use of the one-way effect or the two-way effect of a shape memory alloy for switching an electrical current.

A drive apparatus of the type described in the preamble of claim 1 is also known (DE-OS 37 31 146) in which a two-part element made from a shape memory alloy is configured so that the two component elements can each be used, with the one-way effect, in opposition with respect to their direction of operation.

Making use of the shape memory effect of a shape memory alloy becomes critical when the effect has to produce a reproducible movement opposing a relatively large force. The movement, for example, of actuating a valve has to be carried out in opposition to a force of approximately 100N. The path of the movement achievable in this case is generally not reproducible over a large number of cycles.

SUMMARY OF THE INVENTION

The object of the invention is to configure a silent drive apparatus for reversible movements for operating an actuator so that the drive apparatus is able to apply the force necessary to operate the actuator and the movements are nevertheless reproducible over a large number of cycles.

The object described is solved according to the invention by drive apparatus for effecting reversible movements of an actuator, the drive apparatus comprising:

- a drive element comprising a winding made from a shape memory alloy with one-way effect, the winding comprising a plurality of turns of wire;
- a lever rotatable about an axle in opposition to the force of a resetting element; and
- means defining an anchor point for the turns of said winding; wherein the turns of said winding are fixed and arranged mechanically parallel between said anchor point and said lever such that said lever is rotatable about said axle by means of deformation of a said turn and the tractive force applied to said lever by said winding results from the individual forces applied by said turns acting mechanically parallel upon said lever, whereby said lever can be used as a coupling element for converting a deformation of said winding into a movement of the actuator.

Advantageous configurations are set forth in the dependent claims.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
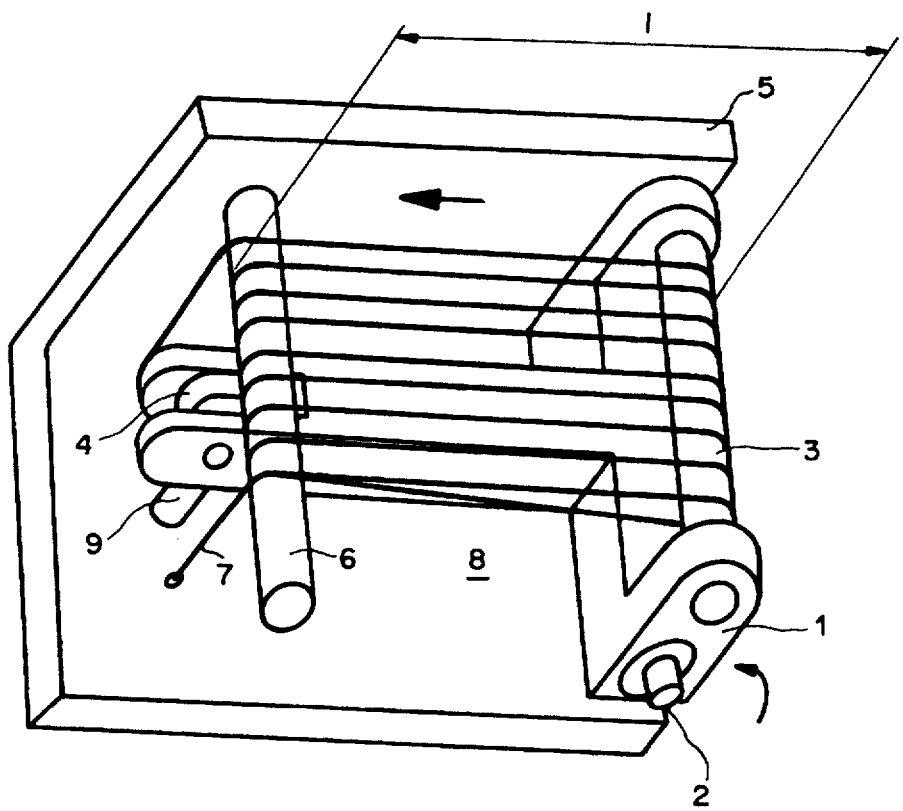
FIG. 1 shows the construction of a drive apparatus embodying the invention with a drive element made from a shape memory alloy.

In FIG. 1, the designation 1 refers to a lever rotatably mounted about an axle 2, which is provided at one end with a first bolt 3, advantageously arranged parallel to the axle 2, and at the other end with a bearing 4. The axle 2 is fixed to a housing 5, onto which a bolt 6 is arranged and fixed at a set distance apart from the axle 2 and advantageously parallel to the axle 2.

A wire 7 is wound in a plurality of turns around the two parallel bolts 3 and 6 in such a way that the turns between the two bolts 3 and 6 are tensioned and thereby form a flat winding with a larger diameter 1, by means of which the two bolts 3 and 6 are mechanically coupled with one another.

The lever 1 is coupled to an actuator by means of the bearing 4. The actuator is in this case a valve with a valve plunger 9 for controlling or regulating the flow of a liquid or gaseous flowable medium. The drive apparatus shown can also be used for other actuators however, for example for ventilators.

The wire 7, and thereby also the winding 8 are composed of a shape memory alloy, whereby the winding 8 can be used as a silent drive element for moving the lever 1 or for driving the actuator coupled to the lever 1 by means of the bearing 4.

The shape memory alloy and the wire 7 are advantageously selected and prepared so that the wire 7 shortens when it is heated to above a first deformation initiation temperature $A_s$. At temperatures above the first deformation termination temperature $A_f$ the shape memory alloy is in the austenitic state.

Figure 2:
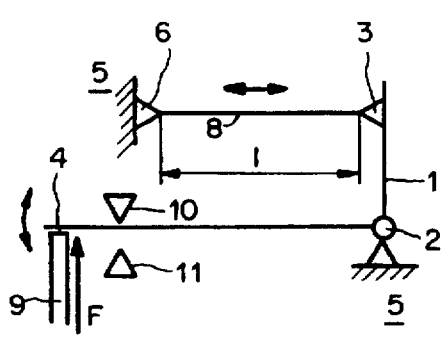
FIG. 2 is a schematic diagram of the operation principles of the drive apparatus.

In FIG. 2 the advantageous drive apparatus according to FIG. 1 is shown again schematically to clarify the principle of its operation. If the wire 7, and also thereby the larger diameter 1 of the flat winding 8 is shortened by heating of the wire 7, the lever 1 rotates counter-clockwise about the axle 2, as the axle 2 and also the winding 8 are fixed onto the housing 5. By heating the wire 7, the lever 1 can be rotated in opposition to a resetting force F away from a first stop 10 to a second stop 11, wherein the valve plunger 9 or an actuator is operable by the bearing 4. The resetting force F is produced by a resetting element, wherein the resetting element is preferably a spring.

When the wire 7 cools to below a second deformation initiation temperature $M_s$, martensite is formed in the wire 7, whereby in the cooled state the yield point in particular of the wire 7 is substantially reduced. At temperatures below the second deformation initiation temperature $M_s$, the wire 7, and thereby the winding, can be extended by the resetting force F of the resetting element, so that the larger diameter l of the winding is enlarged. By means of the cooling of the wire 7 the lever 1 can be rotated by the resetting force F away from the second stop 11 to the first stop 10, wherein the valve plunger 9 or actuator is operable by means of the bearing 4.

The two stops 10 and 11 respectively define a first limit of travel and a second limit of travel of the actuator. Advantageously the two stops 10 and 11 are configured on the housing 5 and on the lever 1. The actuator is thus carried over to a first limit of travel by the heating of the wire 7 and to a second limit of travel by cooling of the wire 7.

Advantageously the resetting element is integrated into the actuator. In an advantageous variation of the driving apparatus, the resetting element is formed by the plunger 9 pressed by a spring against the lever 1.

As the winding 8 is made up of a plurality of turns of the wire 7, the tractive force between the two bolts 3 and 6 occurring during heating above a first deformation initiation temperature $A_s$ is composed of a plurality of component forces acting in a mechanically parallel manner, wherein one component force is composed of two individual forces of one turn occurring parallel to the larger diameter l of the flat winding 8. The tractive force is thereby proportional to the number of turns of the winding 8.

Figure 3:
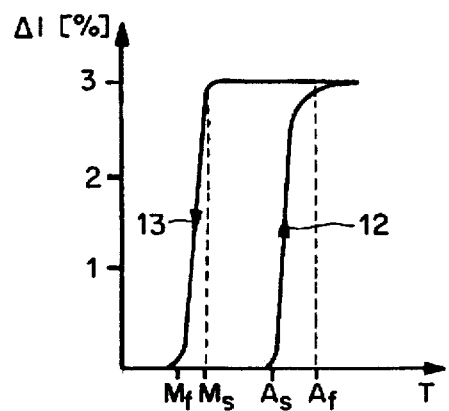
FIG. 3 is a diagram of development of the deformation of the drive element.

The deformation Δl of the winding 8 used as a drive element occurring during heating and cooling respectively is shown in FIG. 3. When the wire 7 is heated above the first deformation initiation temperature $A_s$ to a first deformation termination temperature $A_f$, a first deformation caused by the so-called memory effect occurs in the direction of a first arrow 12, while when the wire 7 is cooled below the second deformation initiation temperature $M_s$, to a second deformation termination temperature $M_f$, a second deformation caused by the resetting element occurs in the direction of a second arrow 13. The first deformation of the drive element occurring upon heating is essentially a shortening, while the second deformation occurring upon cooling is an extension.

As the winding 8 used as the drive element is advantageously provided with a plurality of turns acting mechanically parallel, a tractive force necessary for operating the actuator can also be attained with a relatively thin wire 7, in that the number of turns in the winding is matched to the required tractive force. The tractive force of the winding 8, the resetting force of the resetting element and the transmission ratio of the lever 1 can be coordinated in a known manner with little expenditure. A necessary mechanical lifting of the actuator is to a large extent achievable because of the configuration of the rotatable lever 1.

Figure 4:
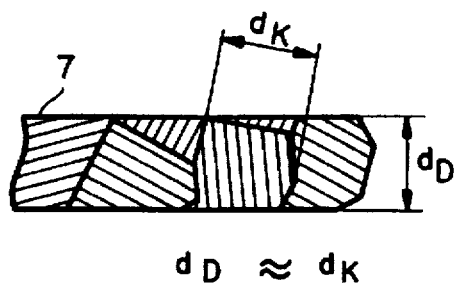
FIG. 4 shows the grain structure of the shape memory alloy in the austenitic state.

At temperatures above the first deformation initiation temperature $A_s$, that is to say when the wire is in the heated state, the shape memory alloy has an austenitic microstructure, wherein the standardised diameter $d_K$ of a crystalline grain has a characteristic value. In a nickel-titanium alloy the standardised diameter $d_K$ of the grain is approximately 0.25 mm (S. Eucken: Progress in Shape Memory Alloys, DGM 1992, p. 178). If the diameter $d_D$ of the wire 7—as shown in FIG. 4—is approximately equal to the standardised diameter $d_K$ of the grain of the shape memory alloy used for the drive element, the reversible movement of the drive element is also sufficiently accurately reproducible over a large number of cycles—for example for $10^5$ movement cycles. Using a nickel-titanium alloy, the diameter $d_D$ of the wire 7 is advantageously in the range of 0.1 mm to 0.4 mm. Furthermore, the capacity for reproduction of the reversible movement is improved in that the shortening occurring between the first deformation initiation temperature $A_s$, and the first deformation termination temperature $A_f$ is relatively small. With a nickel-titanium alloy advantageously a shortening of only approximately 3% is involved.

Figure 5:
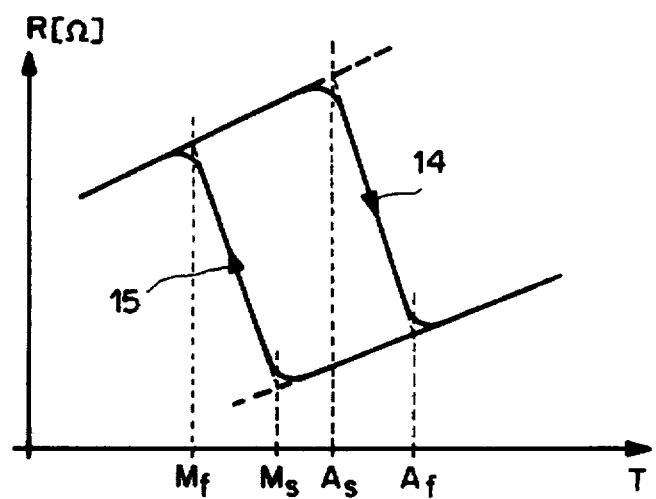
FIG. 5 shows the qualitative development of the electrical resistance of the drive element.

The electrical resistance R of the shape memory alloy has a hysteresis-type development dependent upon the temperature T, as shown qualitatively in FIG. 5. With corresponding heating above the first deformation initiation temperature $A_s$, the electrical resistance experiences a pronounced first change 14, while with corresponding cooling to below the second deformation initiation temperature $M_s$, a pronounced second change 15 occurs.

The winding 8 used as the drive element is advantageously directly electrically heated, in that the winding 8 is switchably connected to a current or voltage source. Essentially, there are two variations by which the winding 8 can be supplied electrically. In a first variation, the wire 7 is connected to a source of electrical energy such that a switched-on current i flows through each turn of the winding 8, so that the individual turns are connected in series. In a second variation the individual turns of the winding 8 are connected in parallel, so that each turn also functions as the parallel connection between two sections of a turn each of which is the length of the larger diameter of the winding l.

In the first variation the individual turns of the winding 8 are wound so that they are electrically insulated from one another. Advantageously electrical insulation is produced in that the two bolts 3 and 6 used as winding supports are insulated with respect to the winding 8, and an insulating distance is maintained between the individual turns. The two bolts 3 and 6 have, for example, insulation made from ceramics or a heat resistant plastics material.

The second variation has the advantage, with respect to the first variation, that the electrical insulation between the bolts 3 and 6 and the winding is eliminated. In the second variation a current source is used for heating which advantageously is connected to the two bolts 3 and 6.

The deformation initiation temperatures $A_s$ and $M_s$, as well as the deformation termination temperatures $A_f$ and $M_f$ can be to a large extent matched to an application by the appropriate choice of shape memory alloy.

If the shape memory alloy has a second deformation termination temperature $M_f$ which is substantially above the ambient temperature of the drive apparatus, cooling of the drive element can be obtained by switching off the current in the wire 7. If with a nickel-titanium alloy the second deformation initiation temperature is, for example, approximately 55° C., and the second deformation termination temperature $M_f$ is approximately 35° C., the cooling or extension of the drive element after switching off the current in the wire 7 lasts approximately 40 sec. at room temperature.

Figure 6:
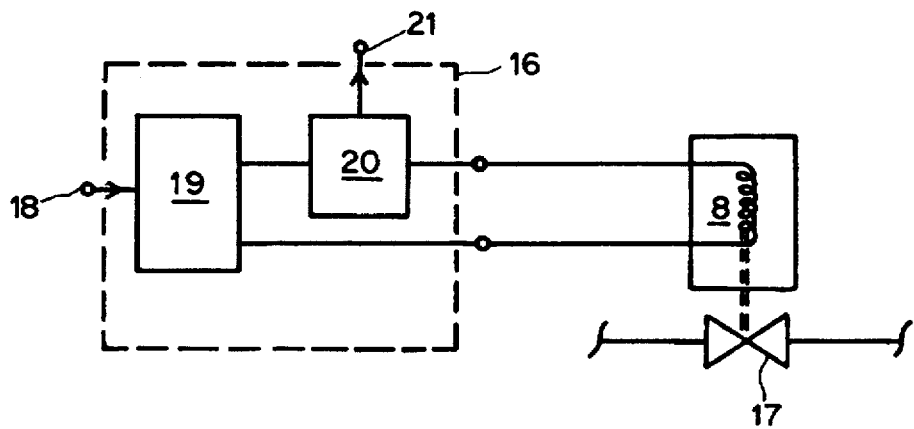
FIG. 6 is a schematic diagram of the electrical control of the drive element.

In FIG. 6 an advantageous control apparatus for the winding 8 which can be used a drive element for a valve 17, is designated by 16. The control apparatus 16 connected to the winding 8 has an electrical energy source 19 controllable by means of a control input 18, and a measuring circuit 20. The energy source 19 is advantageously a constant voltage or constant current source, the output value of which can at least be switched on and off by means of the control input 18. In further variations of embodiments, the output value of the energy source 19 can be adjusted continuously or stepwise by means of the control input 18.

The two changes 14 and 15 (FIG. 5) in the electrical resistance R of the winding 8 can be sensed by the measuring circuit 20. As the electrical resistance 8 is measured when the control apparatus 16 is operating, a signal of the state of the form of the drive element, that is to say a signal of the state of opening or closure of the valve 17 is available in the measuring circuit 20. The signal is available at an output 21 of the measuring circuit 20 as a feedback signal from the drive apparatus embodying to the invention. Furthermore, where required an instantaneous value of the signal can be stored in the control apparatus 16.

A feedback signal from the drive apparatus is available by means of the advantageous control apparatus 16 without additional expenditure in the form of a wiring system or an assembly being necessary for obtaining the signal at the valve 17 or at the drive element, that is to say the winding 8.

Figure 7:
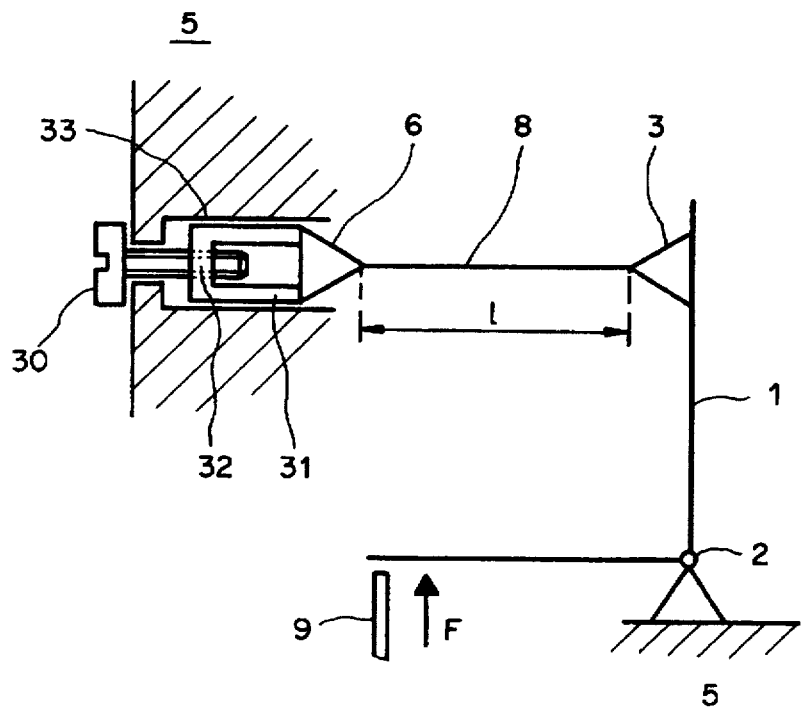
FIG. 7 is a diagram illustrating the operation of the mechanical adjustment of the operating point.

In the schematic representation of the winding 8 tensioned between the two bolts 3 and 6, and of the lever 1 rotatable about the axle 2 and acting upon the valve plunger 9 shown in FIG. 7, a screw is designated 30 and a bracket fixed to the second bolt 6 is designated 31, which has a thread 32 matching the screw 30. The screw 30 and the bracket 31 are mounted and guided by a guiding means 33 advantageously configured on the housing 5, such that the second bolt 6 is moveable in a linear manner in a specific area by rotation of the screw 30, whereby the winding 8 can be extended.

The screw 30, the bracket 31 and the guiding means 33 form an advantageous adjustment means for adjusting the operating point of the drive element, that is to say the winding 8, upon the valve plunger 9, wherein the operating point can be adjusted by rotation of the screw 30. Essentially the operating point of the drive element is adjusted by means of the adjustment means by extension or relaxation of the winding 8. Naturally, the representation of the adjustment means in FIG. 7 is just one variation among a large number of possible variations of the adjustment means; a further variation of the adjustment means could act directly on the lever 1, whereby the extension or relaxation of the winding 8 required for adjustment of the operating point would take place via the lever 1.

Figure 8:
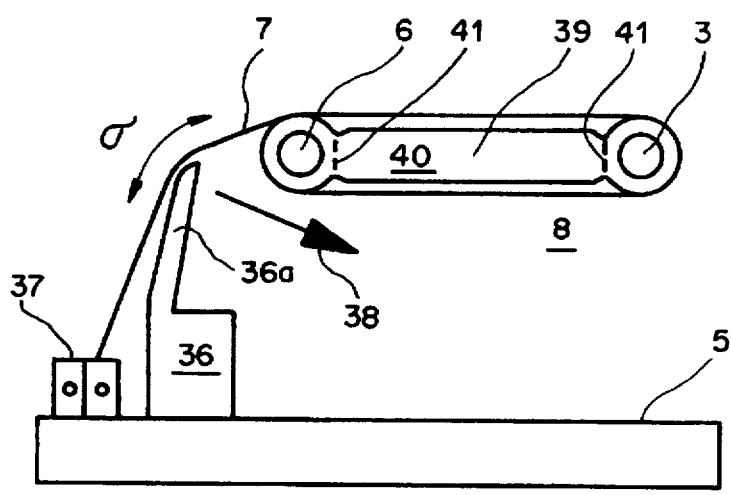
FIG. 8 shows an electrical connection means for the drive element.

In FIG. 8 a mechanical compensating element is designated 36, by means of which the wire 7 is guided from the winding 8 to a terminal 37 to which the control apparatus 16 or another electrical voltage or current source can be connected. The compensating element 36 is configured and arranged so that a mechanical tensile stress σ occurring in the wire 7 between the second bolt 6 and the terminal 37 when the wire 7 is directly heated is limited. The compensating element 36 is provided, for example, with an elastic tongue 36a which can be displaced in the direction of a further arrow 38 when there is an increasingly large tensile stress σ sufficiently far so that the tensile stress σ is always limited to a permissible value during direct heating, so that the wire 7 is not mechanically overloaded.

Advantageously, the mechanical compensating element 36 is made from a polymer which is elastic, electrically insulating and temperature resistant, and in addition is a poor dissipator of heat. The compensating element 36 and the terminal 37 form an advantageous electrical connection means for the winding 8, in which a tensile stress σ occurring between the terminal 37 and the anchor point 6 of the winding 8 when there is direct heating is limited to a permissible value by an elastic deformation of the compensating element 36.

A winding body 40, advantageously provided with at least one bar 39, is used for producing the winding 8, which can be displaced over the two bolts 3 and 6 in order to mount the winding 8 in the housing 5, wherein after the winding 8 has been mounted in the housing 5, and before the initiation of the drive apparatus, the bar 39 is removed so that the two bolts 3 and 6 are moveable with respect to one another by means of the winding 8. Advantageously the bar 39 is provided with breaking points 41, by means of which the bar 39 can be removed by being broken off.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Drive apparatus for effecting reversible movements of an actuator, the drive apparatus comprising:

a drive element comprising a winding made from a shape memory alloy with one-way effect, the winding comprising a plurality of turns of wire;

a lever rotatable about an axle in opposition to the force of a resetting element;

an anchor point for the turns of said winding;

wherein the turns of said winding are fixed and arranged mechanically parallel between said anchor point and said lever such that said lever is rotatable about said axle by means of deformation of a said turn and the tractive force applied to said lever by said winding results from the individual forces applied by said turns acting mechanically parallel upon said lever, wherein said lever can be used as a coupling element for converting a deformation of said winding into a movement of the actuator; and wherein the diameter of said wire is substantially equal to the standardized diameter of the crystalline grain of said shape memory alloy in the austenitic state.

2. Drive apparatus according to claim 1, wherein the drive element and the resetting element are configured so that the wire shortens substantially when heated above a predetermined temperature, wherein the winding effects movement of the lever to a first end position, and so that the wire extends substantially when cooled below a further predetermined temperature by means of the force of the resetting element, wherein the lever moves to a second end position.

3. Drive apparatus according to claim 1, wherein the diameter of said wire is less than 0.4 mm.

4. Drive apparatus according to claim 1, wherein the shape memory alloy is a nickel-titanium alloy.

5. Drive apparatus according to claim 1, further comprising an electrical energy source connectable to said wire for directly electrically heating the wire.

6. Drive apparatus according to claim 5, further comprising a measuring circuit for sensing a change in the electrical resistance of the wire and generating an electrical signal indicative of the current state of the form of the drive element or of the current state of the actuator.

7. Drive apparatus according to claim 1, wherein said anchor point comprises a first bolt and wherein said lever includes a second bolt, the winding being tensioned between the first and second bolts, and wherein the apparatus includes adjustment means for adjusting the tensioning of the winding so as to adjust the mechanical operating point of the drive element.

8. Drive apparatus according to claim 1, further comprising an electrical connection for said winding, said electrical connection comprising a terminal for connection to the two ends of the wire and a mechanically elastic compensating element arranged for limiting to a permissible value the tensile stress of the wire between the terminal and said anchor point, when the wire is directly heated, through elastic deformation of said compensating element.

* * * * *